(12) United States Patent
Boye et al.

(10) Patent No.: US 6,404,958 B1
(45) Date of Patent: Jun. 11, 2002

(54) INTERGRATED OPTICAL COUPLER

(75) Inventors: Robert R. Boye, Concord; Michael R. Feldman; James E. Morris, both of Charlotte, all of NC (US)

(73) Assignee: Digital Optics Corp., Charlotte, NC (US)

( * ) Notice: Subject to any disclaimer, the term of this patent is extended or adjusted under 35 U.S.C. 154(b) by 4 days.

(21) Appl. No.: 09/702,830

(22) Filed: Oct. 31, 2000

(51) Int. Cl.[7] .................................................. G02B 6/26
(52) U.S. Cl. .......................................... 385/47; 385/39
(58) Field of Search ............................. 385/47, 38, 44, 385/48, 45

(56) References Cited

U.S. PATENT DOCUMENTS

| | | | |
|---|---|---|---|
| 4,748,614 A | 5/1988 | Dammann et al. ............. | 370/5 |
| 5,107,359 A | 4/1992 | Ohuchida ................... | 359/124 |
| 5,555,330 A | 9/1996 | Pan et al. ...................... | 385/39 |
| 5,796,889 A | 8/1998 | Xu et al. ........................ | 385/24 |
| 5,799,121 A | 8/1998 | Duck et al. .................... | 385/47 |
| 5,859,717 A | 1/1999 | Scobey et al. .............. | 359/124 |
| 5,933,260 A | 8/1999 | Cao et al. ................... | 359/124 |
| 5,963,684 A | 10/1999 | Ford et al. ..................... | 385/24 |
| 6,084,994 A | 7/2000 | Li et al. ........................ | 385/31 |

*Primary Examiner*—Tulsidas Patel
(74) *Attorney, Agent, or Firm*—Susan S. Morse

(57) ABSTRACT

An integrated optical coupler includes multiple ports and a beam discriminating element. Optical elements are provided for directing light to and from the ports and the beam discriminating element. These optical elements may include two optical elements created on the same surface of a substrate. All of the optical elements needed for directing the light may be formed on a transparent substrate or on a structure in the optical path bonded to the substrate. The optical elements may output light of the different wavelengths at the same angle or may be dispersive. The beam discriminating element may discriminate on the basis of wavelength or polarization.

37 Claims, 4 Drawing Sheets

INTERGRATED OPTICAL COUPLER

BACKGROUND OF THE INVENTION

1. Field of the Invention

The present invention is directed to an integrated optical coupler that may be used with an optical multiplexer/demultiplexer or an optical add/drop multiplexer. More particularly, the present invention is directed to such a coupler having at least two optical elements formed on the same surface. When the discrimination feature for performing the coupling is wavelength, the coupler may include a dispersive element.

2. Description of Related Art

Wavelength division multiplexing allows a plurality of different wavelengths to be transmitted over a common transmission line, typically an optical fiber. There are numerous configurations for combining a plurality of different wavelengths from respective sources, i.e., multiplexing, and for selectively directing a combined signal to separate channels, i.e., demultiplexing. When combining wavelength (s) with an already multiplexed signal or removing a wavelength(s) from an already multiplexed signal, this particular type of multiplexing or demultiplexing is typically referred to as adding or dropping, respectively.

Various devices are used to achieve the desired wavelength selectivity. Such devices include dispersive devices, e.g., prisms and diffractive grating devices, and/or fixed or tunable optical filters. Narrow band pass filters demand precise control of the angle of the incident light relative to the filter. Narrow band pass filters can allow a range of wavelengths to pass through different portions thereof by continuously varying the film thickness across the filter aperture. In this configuration, the light beam is incident at the same angle, but due to the varying thickness of the filter, the wavelength selectivity varies. Alternatively, such control of wavelength selectivity may be realized by providing a non-parallel optical block. However, these configurations rely on the precise control of either the thickness or the wedge to insure selectivity.

Integration has been recognized as the way to achieve compact WDM couplers. Currently, such integration typically involves using fibers inserted to either end of a sleeve with a gradient index (GRIN) lens and a filter therein. The angle at which the light is incident on the filter may be adjusted by offsetting the fiber perpendicular to the longitudinal axis of the GRIN lens. However, GRIN lenses are bulky and expensive, limiting the compactness and cheapness that may be achieved even for integrated WDMs.

Further, multiplexing in the time domain is also known. Here, the wavelengths of the signals may be the same, but the time domain is divided so that the signals are interleaved in accordance with a determined time slot corresponding to that signal. These configurations also typically employ GRIN rods. Further, such coupling typically involves bulky polarizing combiners, limiting the integration of the coupler.

SUMMARY OF THE PRESENT INVENTION

The present invention is therefore directed to an integrated coupler that substantially overcomes one or more of the problems due to the limitations and disadvantages of the related art.

It is an object of the present invention to use the angle versus wavelength variation present in a diffractive optical element to realize wavelength selectivity in conjunction with a wavelength filter. This allows the cost of the system to be lowered by reducing the requirements on the filters. By combining elements which output light at different wavelengths at differing angles with a dielectric filter, the control of the wavelength multiplexing in accordance with the present invention may be realized by optically rather than structurally.

It is a further object of the present invention to provide a compact integrated multiplexer/demultiplexer, particularly one that can be mass-produced by combining at least some of the elements at a wafer level.

It is another object of the present invention to direct light between a beam discriminating element and ports using at least two optical element formed on a single surface.

At least one of the above and other objects may be realized by providing an optical device including a beam discriminating element, which treats signals having at least one different characteristic differently, a first port positioned relative to the beam discriminating element for propagating at least a first signal, a second port positioned relative to the beam discriminating element for propagating at least a second signal, the first and second signals having at least the at least one different characteristic from one another at the beam discriminating element, a third port positioned relative to the beam discriminating element for propagating at least the first signal and the second signal; and a plurality of optical elements, each optical element associated with one of the first through third ports, between an associated port and the beam discriminating element, at least two of the plurality of optical elements formed on a single surface, such that signals are directed between respective ports and the beam discriminating element.

The beam discriminating element may be wavelength sensitive. The beam discriminating element may be polarization sensitive. The beam discriminating element may be a dielectric stack. The optical device may include a polarization rotating element between one of the first and second ports and the beam discriminating element. The beam discriminating element may a multiplexer, the first and second ports serve as input ports, and the third port serves as an output port. The beam discriminating element may be a demultiplexer, the third port serves as an input port, and the first and second ports serves as output ports. The optical elements may dispersive optical elements, e.g., diffractive optical elements. The optical elements may be off-center refractive optical elements.

At least one of the above and other objects of the present invention may be realized by providing an optical device including a wavelength selective filter, a first port positioned relative to the wavelength selective filter for propagating at least a first wavelength, a second port positioned relative to the wavelength selective filter for propagating at least a second wavelength different from the first wavelength signal, a third port positioned relative to the wavelength selective filter for propagating at least the first wavelength and the second wavelength, and at least two dispersive optical elements, each dispersive optical element associated with one of the ports, between an associated port and the wavelength selective filter. The wavelength selective filter and the plurality of dispersive optical elements may be integrated on a substrate level.

At least one of the above and other objects of the present invention may be realized by providing all of the plurality of optical elements may be on a same substrate or on substrates bonded together. The bonding of the substrates results in formation of multiple optical devices, and the bonded substrates are diced to form the optical device. Spacer elements may be provided between the substrates, the spacer elements being bonded to the substrates. The beam discriminating element may be bonded to at least one of the substrates before the substrates are diced. At least some of the plurality of optical elements may be formed on at least two substrates bonded together creating multiple sets of the plurality of optical elements, the bonded substrates being diced to form multiple optical devices.

At least one of the above and other objects may be realized by providing an optical multiplexer including a beam discriminating element, which treats signals having at least one different characteristic differently, a first input port positioned relative to the beam discriminating element for propagating at least a first signal, a second input port positioned relative to the beam discriminating element for propagating at least a second signal, said first and second signals having at least said at least one different characteristic from one another at the beam discriminating element, an output port positioned relative to the beam discriminating element for propagating the first signal and the second signal, and a first substrate that is optically transparent and having first and second opposing faces, wherein all optical elements needed to insure the first and second signals have said at least one characteristic different from one another at the beam discriminating element, and to direct at least one of the first and second signals from the first and second input ports to the beam discriminating element and from the beam discriminating element to the output port, are on at least one of the first substrate and any structure in an optical path in the device bonded to the first substrate.

The first substrate may have at least two of the plurality of optical elements formed thereon. The first substrate may have at least two of the plurality of optical elements formed on a single surface thereof. The plurality of optical elements may include an individual optical element for each port. The bonding of the first substrate and any structure results in formation of multiple optical multiplexers, and the bonded substrates are diced to form the optical multiplexer.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which.

DETAILED DESCRIPTION OF PREFERRED EMBODIMENTS

Figure 1:
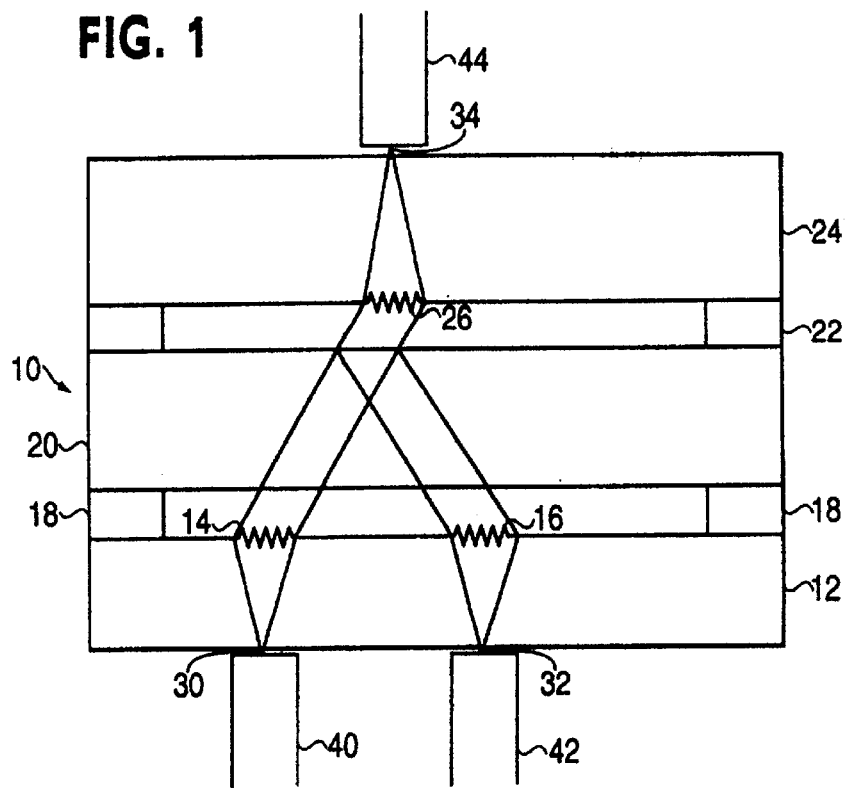
FIG. 1 is a representational cross-sectional diagram of an embodiment of an integrated coupler of the present invention.

FIG. 1 illustrates a representational cross-sectional view of an integrated coupler of the present invention. As shown therein, the coupler 10 includes a substrate 12 having diffractive elements 14, 16 thereon, spaced by spacers 18 from a dielectric filter 20, which in turn is spaced by spacers 22 from a substrate 24 having another diffractive element 26 thereon. There is a diffractive element provided for each port 30, 32, 34. As shown in FIG. 1, light may be supplied to these ports using corresponding optical fibers 40, 42, 44.

These ports 30, 32, 34 may variously serve as input ports or output ports, as long as there is at least one input port and at least one output port. For example, the input port may be port 30, receiving light of multiple signals, in the following example the signals having different wavelengths, from input fiber 40. This multiple wavelength light is collimated by the diffractive optical element 14. The diffractive optical element 14 also outputs light at different wavelengths at different angles. Therefore, the multiple wavelength light will be incident on the wavelength selective filter 20 at different angles. This control of the angles at which the light is incident on the filter 20 allows the wavelength selectivity of the filter 20 to be tuned, reducing the accuracy requirements, and thus the cost and complexity of the filter 20. Having different wavelengths be incident on the filter 20 at different angles further reduces the complexity and cost of the design, since now two variables, i.e., wavelength and incident angle, are available to discriminate the light to be passed from the light to be reflected.

When serving as an optical drop multiplexer or as an optical demultiplexer, the filter 20 will remove a wavelength from the input light, transmit the dropped wavelength to the diffractive element 26, while reflecting the remaining wavelengths to the diffractive element 16. The diffractive element 16 focuses the light to the port 32, here serving as an output port to the fiber 42, here serving as an output fiber. The diffractive element 26 focuses the dropped light onto port 34, here serving as an output port, at which fiber 44, here serving as an output fiber, is located.

When serving as an optical add multiplexer or an optical multiplexer, the diffractive element 26 will collimate and deflect the light supplied to port 34, here serving as an input port, from fiber 44, here serving as an input fiber, to the filter 20, which transmits the desired wavelength to be added. The filter 20 reflects the light of different wavelengths supplied from the diffractive element 16 received from the port 32, here serving as an input port, from the fiber 42, here serving as an input fiber. The light is thus combined by the filter 20 and directed to the diffractive element 14, which focuses the light to the port 30, here serving as an output port, to the fiber 40, here serving as an output fiber.

In both cases, since each wavelength will still be incident on the diffractive element for focuses more than one wavelength to a respective port, the diffractive element 16 for the drop configuration and the diffractive element 14 for the add configuration, can effectively focus the light onto their respective output ports 32, 30. In other words, since the deflection grating for all of the diffractive elements 14, 16, 26 has the same period, the respective dispersion for each wavelength is fully compensated by the output port diffractive element, so the wavelengths are supplied to the output fiber at the same angle.

Figure 2:
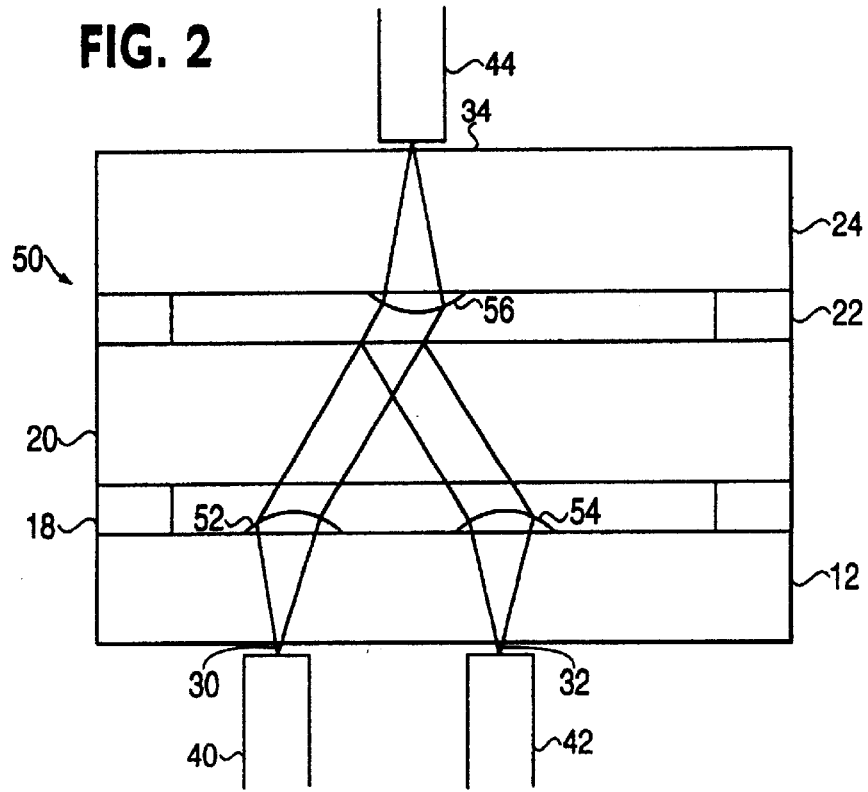
FIG. 2 is a representational cross-sectional diagram of another embodiment of an integrated coupler of the present invention.

An alternative coupler 50 is in shown in FIG. 2, in which the diffractive elements 14, 16, 26 have been replaced with refractive elements 52, 54, 56 positioned off axis relative to the ports 30, 32, 34. These offset refractive elements will provide more efficient coupling of the light than the diffractive elements, and will provide a controlled deflection angle for the light to hit the filter, although this deflection angle is now the same for all wavelengths. Preferably, the refractive elements are made of silicon to reduce the sag height. Otherwise, the operation is similar to that described above.

Figure 3:
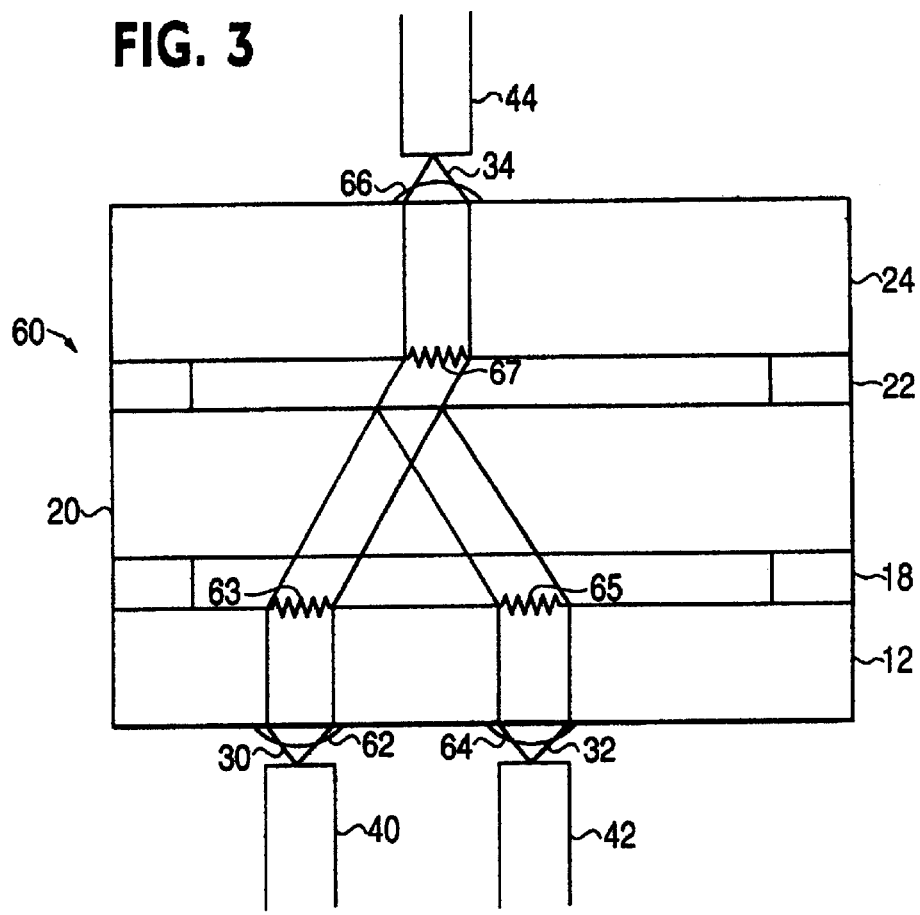
FIG. 3 is a representational cross-sectional diagram of another embodiment of an integrated coupler of the present invention.

Another alternative coupler 60 is shown in FIG. 3, in which on-axis refractive elements 62, 64, 66 are provided on one side of the substrates 12 and 24 and diffractive elements 63, 65, 67 are provided on an opposite side of the substrates. Here, the on-axis refractive elements 62, 64, 66 serve to collimate or focus the light, while the diffractive elements 63, 65, 67 deflect and disperse the light, allowing some of the efficiency gains of the all refractive embodiment of FIG. 2 to be realized while maintaining the angular control of the diffractive elements. Otherwise, the functioning is similar as described above.

Figure 4:
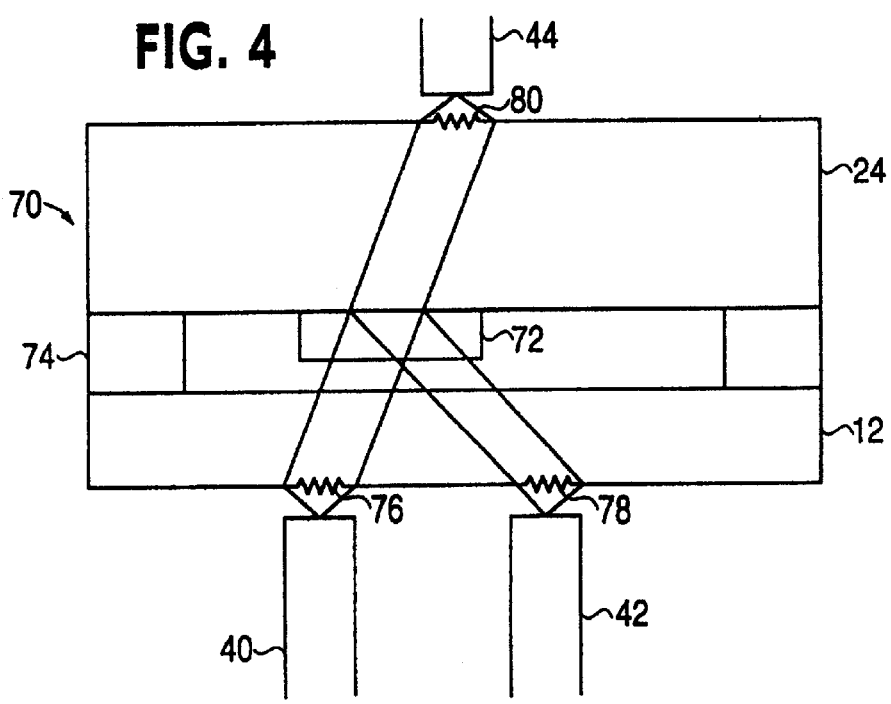
FIG. 4 is a representational cross-sectional diagram of an alternative provision of the dielectric filter for an integrated coupler of the present invention.

It is much easier to produce smaller filters than one large one to be bonded on a wafer level and diced. Even with the cheaper, simpler filters that may be used with the dispersive embodiments, these filters are still relatively expensive compared to the rest of the system, so the use of smaller filters is still advantageous. FIG. 4 illustrates an alternative to providing the filter across the entire coupling structure. As shown in FIG. 4, a wavelength selective filter 72 is provided in the required optical path, but not co-extensive with the substrate 24, 12. For this configuration, it is particularly advantageous to provide the optical elements 76, 77, 80 on at least one of the substrates on a surface opposite the filter and then mount the filter on this substrate. In this configuration, only a single spacing element 74 is needed. Any of the optical element configurations shown in FIGS. 1–3 may be used with the reduced filter configuration of FIG. 4.

Figure 5:
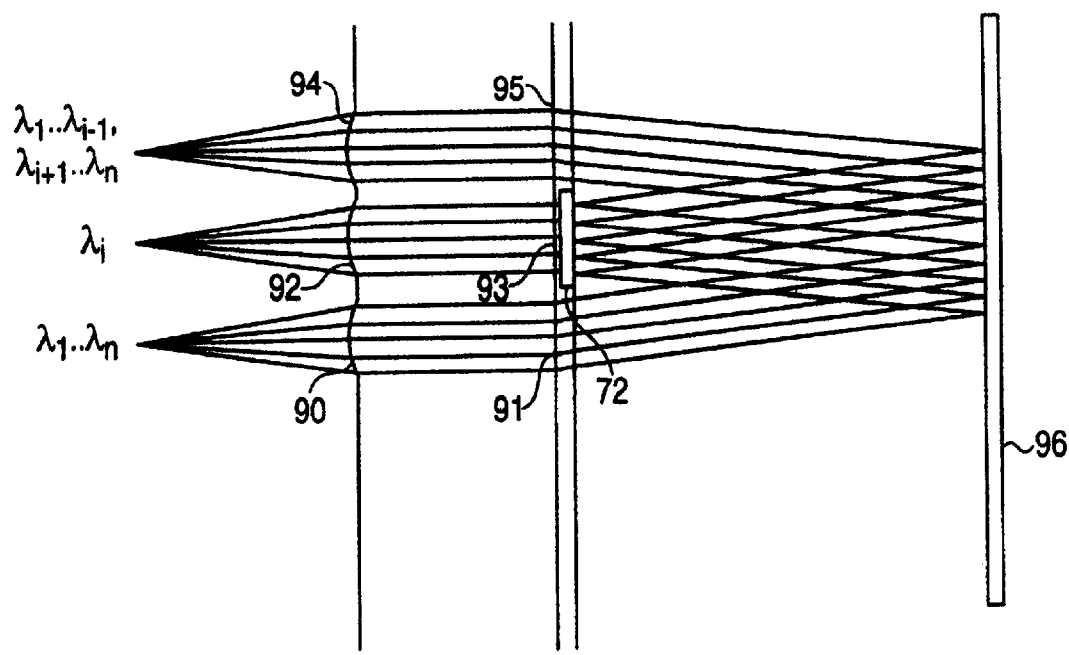
FIG. 5 is a representational cross-sectional diagram of an alternative configuration for the ports in accordance with the present invention.

While all of the above embodiments have illustrated the placement of ports on both sides of the coupler, the ports may be all on the same side of the coupler as shown in FIG. 5. The configuration shown in FIG. 5 is a drop multiplexer, with light having wavelengths $\lambda_1$–$\lambda_n$ being input to refractive optical element 90, which collimates the beam, and diffractive optical element 91 which deflects the light. The deflected light is incident on a reflective surface 96 that reflects the light to a dielectric filter 72. The dielectric filter 72 transmits one wavelength $\lambda_i$ and reflects the remaining wavelengths $\lambda_1$–$\lambda_{i-1}$, $\lambda_{i+1}$–$\lambda_n$. The transmitted wavelength is incident on the optical elements 92, 93 that collimate and focus the beam. The wavelengths reflected by the dielectric filter 72 are incident on the reflective surface 96 again, where they are reflected to the optical elements 94, 95 to be collimated and focused. Any of the above embodiments may be so configured.

Another embodiment uses polarization rather than wavelength as a discriminator in combining two beams. Rather then a wavelength sensitive filter, a beam discriminating element may be a polarization sensitive filter, such as a dielectric filter. When the polarization configuration serves as an optical multiplexer or optical add multiplexer, light beams input at the two input ports are to have orthogonal polarizations. The structure shown in FIG. 5 may be used when the input beams already have orthogonal polarizations, with the dielectric filter 72 being polarization sensitive rather than wavelength sensitive. When the polarization configuration serves as an optical demultiplexer or an optical drop multiplexer, the combined signal is to have the light to be separated from the input beam at an orthogonal polarization to the light to remain in the output beam.

Figure 6:
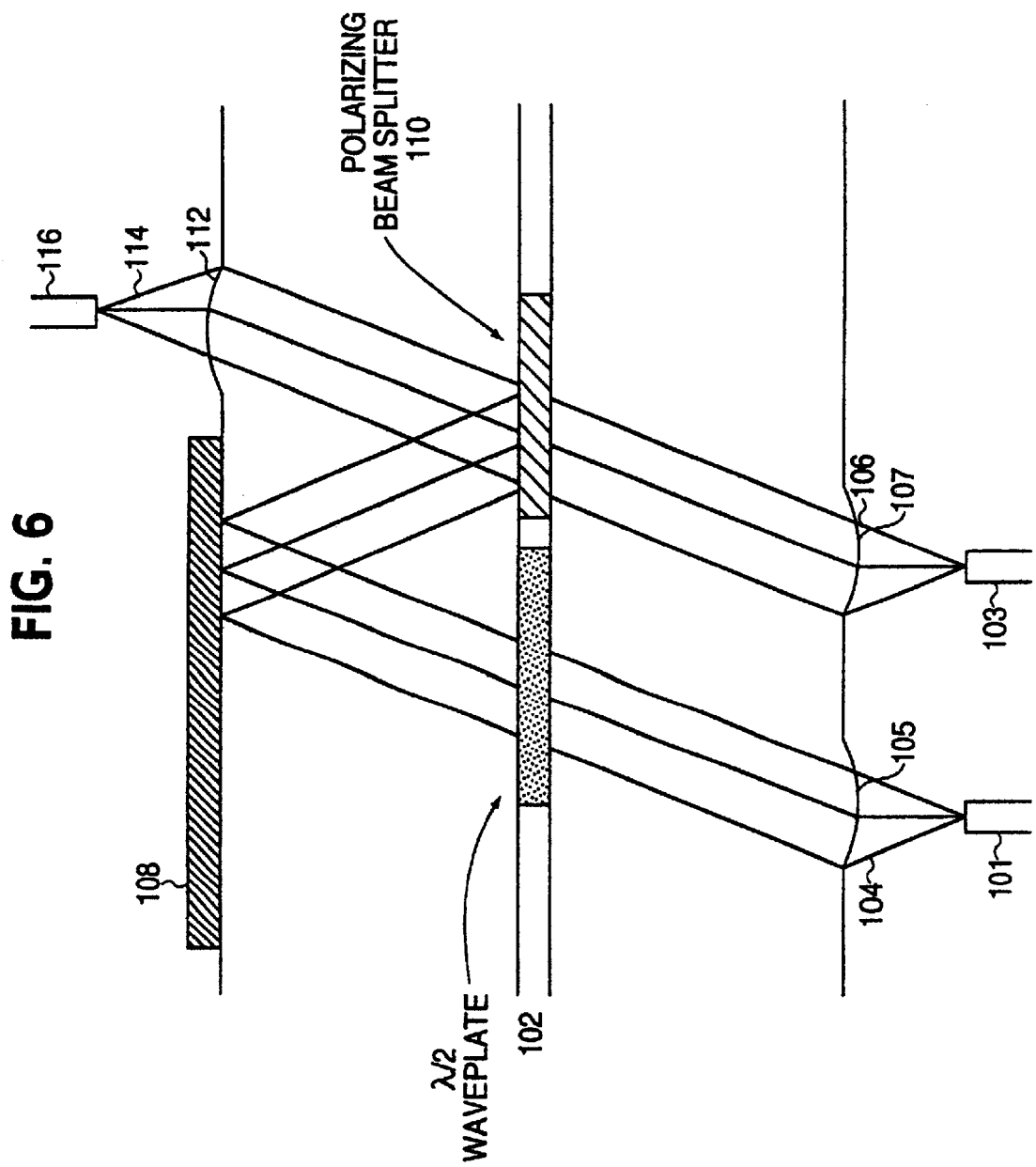
FIG. 6 is a representational cross-sectional diagram of an embodiment of the present invention using polarization for facilitating the operation between the beams.

FIG. 6 is an illustration of an alternate embodiment using polarization to perform a desired operation when the input beams have the same polarization. In this configuration, a polarization rotating element 102, such as a half-wave plate, is inserted in one of the paths between one of the input ports 104, 106 corresponding to input fibers 101, 103, and a polarization sensitive element 110. A deflection element 105 deflects the beam from the input port 104 to the half-wave plate 102. The polarized beam is then incident on a reflective surface 108, which directs the polarized beam towards the polarization sensitive element 110. A deflection element 107 deflects the light from the input port 106 to the polarization sensitive element 110. The polarization sensitive element 110 reflects the altered light and transmits the unaltered light, thereby combining the signals delivered to an output port 112. The polarization rotating element 102 may be positioned anywhere between the input port 104 and the polarization sensitive filter 110. For example, the reflective surface 108 and the half-wave plate may be integrated into the same element. The half-wave plate may be formed in any known manner, including depositing a film on a substrate, photolithographically creating the half-wave plate, and/or from a substrate having the desired characteristics. It is noted that the input wavelengths may be the same when polarization is used as the discriminator.

All of the embodiments may be efficiently created by bonding substrates containing optical elements together to form multiple devices, which are then diced to create the optical device, as set forth, for example, in U.S. Pat. No. 6,096,155 entitled "Wafer Level Integration of Multiple Optical Elements" which is hereby incorporated by reference in its entirety for all purposes. The configurations in which all elements coextensive may be fully constructed on a substrate level, while the other configurations may be partially constructed on a substrate level. For example, a substrate of spacers photolithographically created therein may be used as the spacer 74 and then bonded to a substrate wafer for the substrate 24. Then, the filters 72 may be attached to the same surface of the wafer as the spacer wafer using a conventional semiconductor processing technique of "pick and place." Then, another wafer for the substrate 12 may be bonded to the spacer wafer, and then the bonded wafers diced to form the coupler 70. In all configurations, the final coupler is integrated without using GRIN lenses and includes at least one substrate with at least two optical elements formed thereon.

Figure 7:
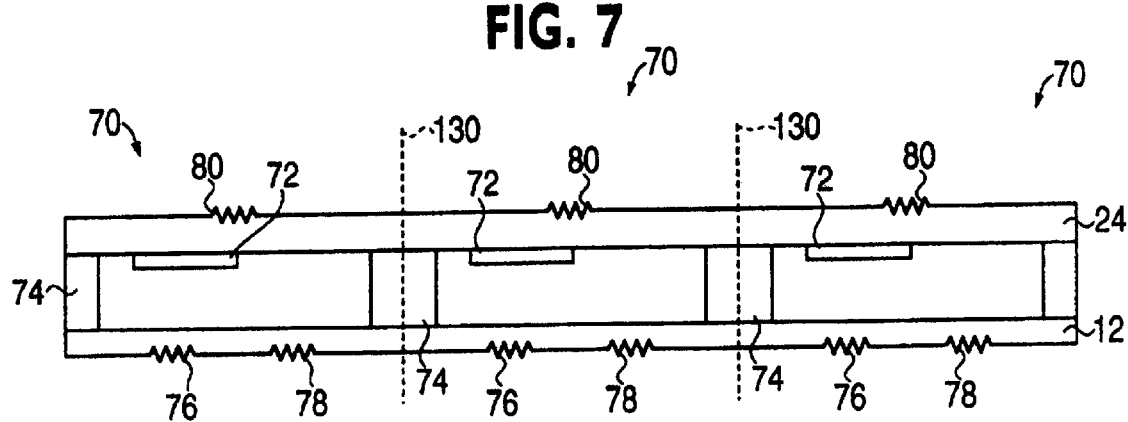
FIG. 7 is a representational cross-sectional diagram illustrating the multiple system production and indicating the dicing lines of the system of FIG. 4.

An example of such multiple device creation is shown in FIG. 7, in which a plurality of systems 70 of FIG. 4 are shown along with dicing lines 130 indicating where the plurality of systems 70 will be separated to form individual systems 70. The substrates 24, 12, may be of any desired shape facilitating simultaneous formation of a plurality of systems 70. The substrates 24, 12 are preferably separated by a spacer wafer 74, which is bonded to the substrates 24, 12 in any known manner, with or without additional bonding materials, such as adhesive. Preferably, the optics are formed lithographically. The plurality of systems are then diced along the dicing lines 130 to form the individual systems 70. Any of the above configurations may be mass-produced in a similar manner.

When incorporating a component not formed on the substrates 12, 24, e.g., a polarization sensitive element 110, a dielectric filter 72, a half-wave plate 102, these components may be bonded to at least one of the substrates 12, 24, as shown in FIGS. 4 and 6 or may be mounted onto another substrates which is then bonded to the substrates to form multiple integrated structures to be diced. When substrates are referred to as bonded to one another, there are not to be assumed to be bonded directly, but may have spacer elements there between, such as shown in FIGS. 1–4. The spacer elements may include a functional component bonded to the substrates, such as the half-wave plate and the polarizing beam splitter shown in FIG. 6. Further, these components, e.g., polarization sensitive element 110, a dielectric filter 72, a half-wave plate 102, may be formed on a substrate, e.g., by depositing appropriate layers to form a thin film structure.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by the appended claims and their legal equivalents, rather than by the examples given.

What is claimed is:

1. An optical device comprising:
   a beam discriminating element, which treats signals having at least one different characteristic differently;
   a first port positioned relative to the beam discriminating element for propagating at least a first signal;
   a second port positioned relative to the beam discriminating element for propagating at least a second signal, said first and second signals having at least said at least one different characteristic from one another at the beam discriminating element;
   a third port positioned relative to the beam discriminating element for propagating at least the first signal and the second signal; and
   a plurality of optical elements, each optical element associated with one of said first through third ports, between an associated port and the beam discriminating element, at least two of said plurality of optical elements formed on a single surface, such that signals are directed between respective ports and said beam discriminating element.

2. The optical device of claim 1, wherein said beam discriminating element is wavelength sensitive.

3. The optical device of claim 2, wherein said beam discriminating element is a dielectric stack.

4. The optical device of claim 1, wherein said beam discriminating element is polarization sensitive.

5. The optical element of claim 4, wherein the beam discriminating element is a dielectric filter.

6. The optical device of claim 4, further comprising a polarization rotating element between one of said first and second ports and said beam discriminating element.

7. The optical device of claim 1, wherein the beam discriminating element is a multiplexer, the first and second ports serve as input ports, and the third port serves as an output port.

8. The optical device of claim 1, wherein the beam discriminating element is a demultiplexer, the third port serves as an input port, and the first and second ports serves as output ports.

9. The optical device of claim 1, wherein the optical elements are dispersive optical elements.

10. The optical device of claim 9, wherein the dispersive optical elements are diffractive optical elements.

11. The optical device of claim 1, wherein the optical elements are off-center refractive optical elements.

12. The optical device of claim 1, wherein all ports are on the same side of the beam discriminating element.

13. The optical device of claim 1, wherein at least two of said ports are on one side of the beam discriminating element and a remaining port is on an opposite side of the beam discriminating element.

14. An optical device comprising:
    a wavelength selective filter;
    a first port positioned relative to the wavelength selective filter for propagating at least a first wavelength;
    a second port positioned relative to the wavelength selective filter for propagating at least a second wavelength different from the first wavelength signal;
    a third port positioned relative to the wavelength selective filter for propagating at least the first wavelength and the second wavelength; and
    at least two dispersive optical elements, each dispersive optical element associated with one of said ports, between an associated port and the wavelength selective filter.

15. The optical device of claim 14, wherein the dispersive optical elements are diffractive optical elements.

16. The optical device of claim 14, wherein each port has a corresponding dispersive optical element.

17. The optical device of claim 14, the wavelength selective filter and the plurality of dispersive optical elements are integrated on a wafer level.

18. The optical device of claim 14, wherein the wavelength selective filter is a multi-layer dielectric stack.

19. The optical device of claim 14, wherein all ports are on the same side of the beam discriminating element.

20. The optical device of claim 14, wherein at least two of said ports are on one side of the beam discriminating element and a remaining port is on an opposite side of the beam discriminating element.

21. The optical device of claim 1, wherein the beam discriminating element is a multiplexer, the first and second ports serve as input ports, and the third port serves as an output port.

22. The optical device of claim 1, wherein the beam discriminating element is a demultiplexer, the third port serves as an input port, and the first and second ports serves as output ports.

23. The optical device of claim 1, wherein all of the plurality of optical elements are on a same substrate or on substrates bonded together.

24. The optical device of claim 23, wherein bonding of said substrates results in formation of multiple optical devices, and said bonded substrates are diced to form the optical device.

25. The optical device of claim 23, further comprising spacer elements between the substrates, the spacer elements being bonded to the substrates.

26. The optical device of claim 24, wherein the beam discriminating element is bonded to at least one of the substrates before the substrates are diced.

27. The optical device of claim 1, wherein the beam discriminating element is a polarizing beam splitter and the optical device further comprises a polarization rotating element between one of said first, second and third ports and the polarizing beam splitter.

28. The optical device of claim 26, wherein substrates on which the plurality of optical elements are formed, the polarizing beam splitter and the half-wave plate are bonded thereon.

29. The optical device of claim 28, wherein bonding occurs at a multiple device level and bonded structures are diced to form the optical device.

30. The optical device of claim 28, wherein the polarizing beam splitter and the half-wave plate are on the same substrate.

31. The optical device of claim 1, wherein at least some of the plurality of optical elements are formed on a substrate containing multiple optical elements to be diced for use in the optical device.

32. The optical device of claim 1, wherein at least some of the plurality of optical elements are formed on at least two substrates bonded together creating multiple sets of the plurality of optical elements, the bonded substrates being diced to form multiple optical devices.

33. An optical multiplexer comprising:
   a beam discriminating element, which treats signals having at least one different characteristic differently;
   a first input port positioned relative to the beam discriminating element for propagating at least a first signal;
   a second input port positioned relative to the beam discriminating element for propagating at least a second signal, said first and second signals having at least said at least one different characteristic from one another at the beam discriminating element;
   an output port positioned relative to the beam discriminating element for propagating the first signal and the second signal; and
   a first substrate that is optically transparent and having first and second opposing faces, wherein all optical elements needed to insure the first and second signals have said at least one characteristic different from one another at the beam discriminating element, and to direct at least one of the first and second signals from the first and second input ports to the beam discriminating element and from the beam discriminating element to the output port, are on at least one of the first substrate and any structure in an optical path in the device bonded to the first substrate.

34. The optical multiplexer of claim 33, wherein the first substrate has at least two of the plurality of optical elements formed thereon.

35. The optical multiplexer of claim 33, wherein the first substrate has at least two of the plurality of optical elements formed on a single surface thereof.

36. The optical multiplexer of claim 33, wherein the plurality of optical elements includes an individual optical element for each port.

37. The optical multiplexer device of claim 33, wherein the bonding of said first substrate and any structure results in formation of multiple optical multiplexers, and said bonded substrates are diced to form the optical multiplexer.

* * * * *